United States Patent

Schwab et al.

[15] 3,690,800
[45] Sept. 12, 1972

[54] INJECTION MOULD HAVING A CLOSURE IN THE INJECTION CHANNEL PARTICULARLY FOR MOULDED SHAPES OF POLYURETHANE

[72] Inventors: Johann Schwab, Vienna; Wladimir Hascic, Maria-Enzersdorf, both of Austria

[73] Assignee: Semperit Osterreichisch-Amerikanische Gummiwerke Aktiengesellschaft, Vienna, Austria

[22] Filed: March 5, 1970

[21] Appl. No.: 16,877

[30] Foreign Application Priority Data

March 6, 1969 Austria ................ A 2248/69
July 22, 1969 Austria ................ A 7023/69

[52] U.S. Cl. .................. 425/192, 425/242, 425/817
[51] Int. Cl. .............................................. B29f 1/00
[58] Field of Search ..... 18/30 RU, 30 US, 34 S, 16 F, 18/24, 30 RM, 30 WM, 30 N, 30 D, 30 NV, 30 NW, 30 B, 30 D, 42 D, 42 H, 30 NS, 30 NY, 30 NZ; 251/5, 7

[56] References Cited

UNITED STATES PATENTS

| 2,988,779 | 6/1961 | Barton et al. ......... 18/30 US X |
| 2,895,505 | 7/1959 | Bachus ................... 251/5 X |
| 3,350,053 | 10/1967 | Schmitz ................. 251/7 X |
| 2,750,959 | 6/1956 | Seggern ................. 251/5 X |

Primary Examiner—H. A. Kilby, Jr.
Attorney—Werner W. Kleeman

[57] ABSTRACT

An injection mould is disclosed for the manufacture of moulded shapes from an injectable material, with a device for closing the injection channel by means of an elastic deformable body, particularly in the processing of foamable synthetic materials. The closing device comprises a diaphragm-type sealing disk, particularly of silicone, which is housed in a cross-bore and held therein by an insert. The diaphragm can be operated approximately perpendicularly to the injection channel by compressed air or by a piston and is substantially arranged in a plane parallel to the axis of the injection channel.

11 Claims, 17 Drawing Figures

Patented Sept. 12, 1972

INVENTORS:
JOHANN SCHWAB
WLADIMIR HASUC

By: Sterner H. Kleeman

ATTORNEY

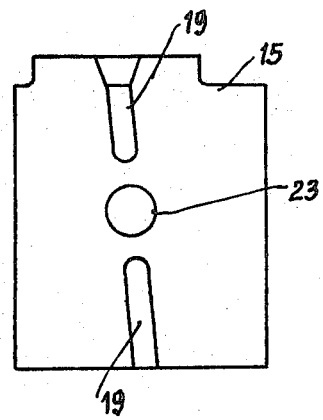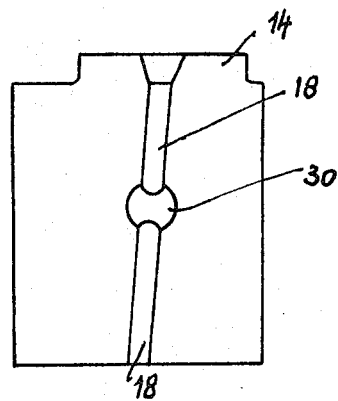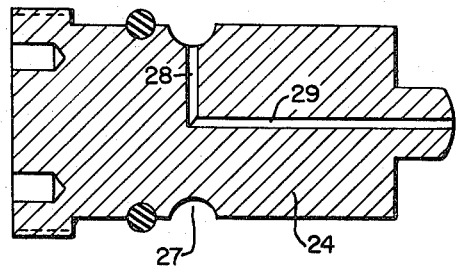

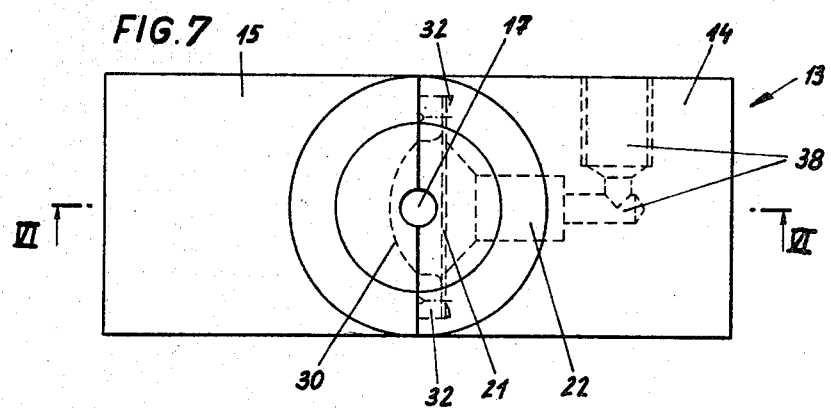
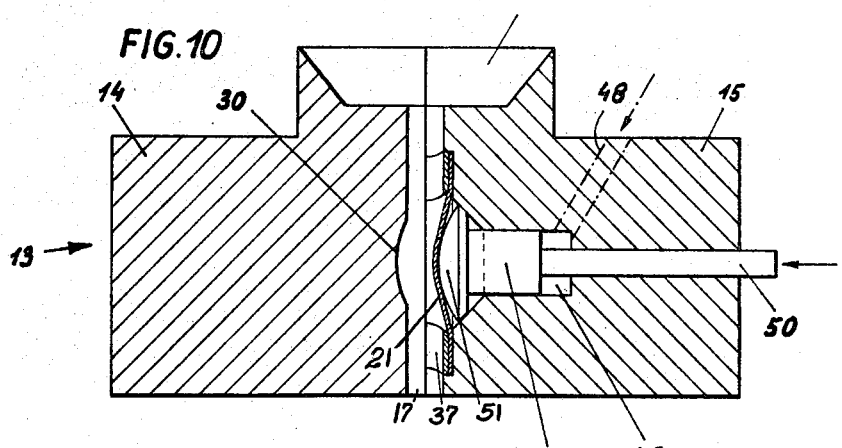
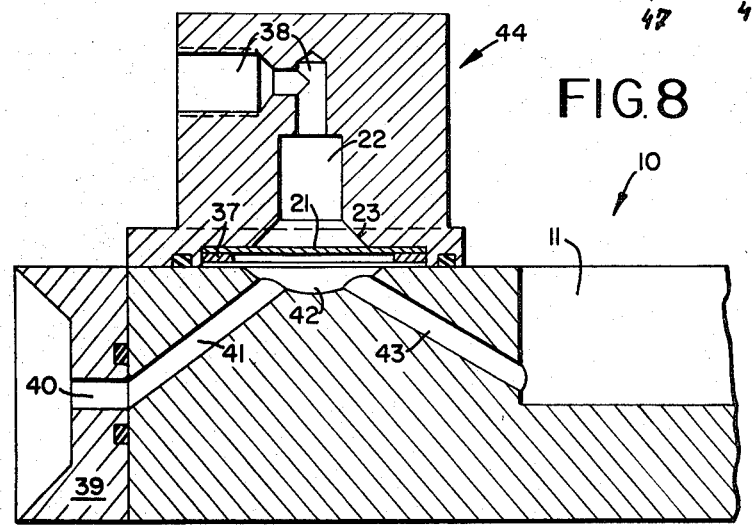

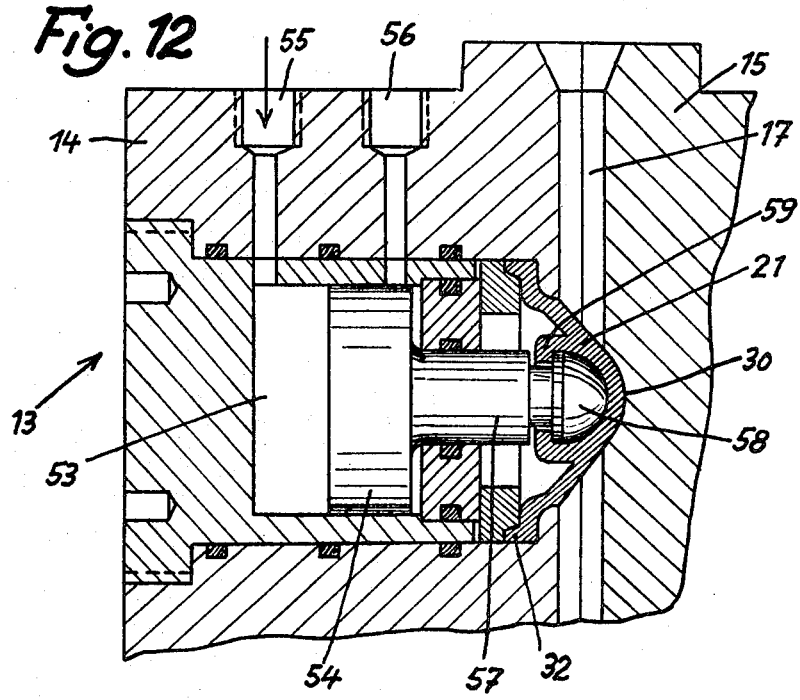
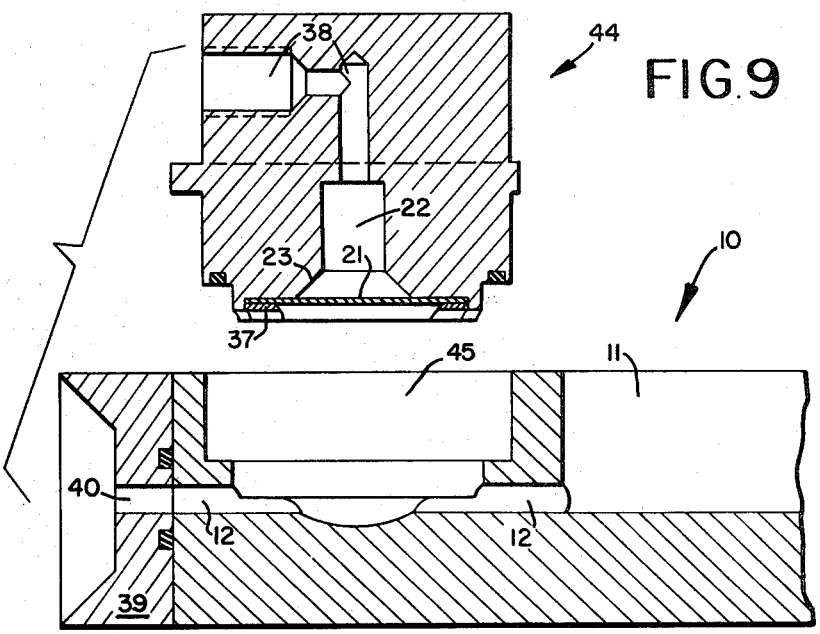

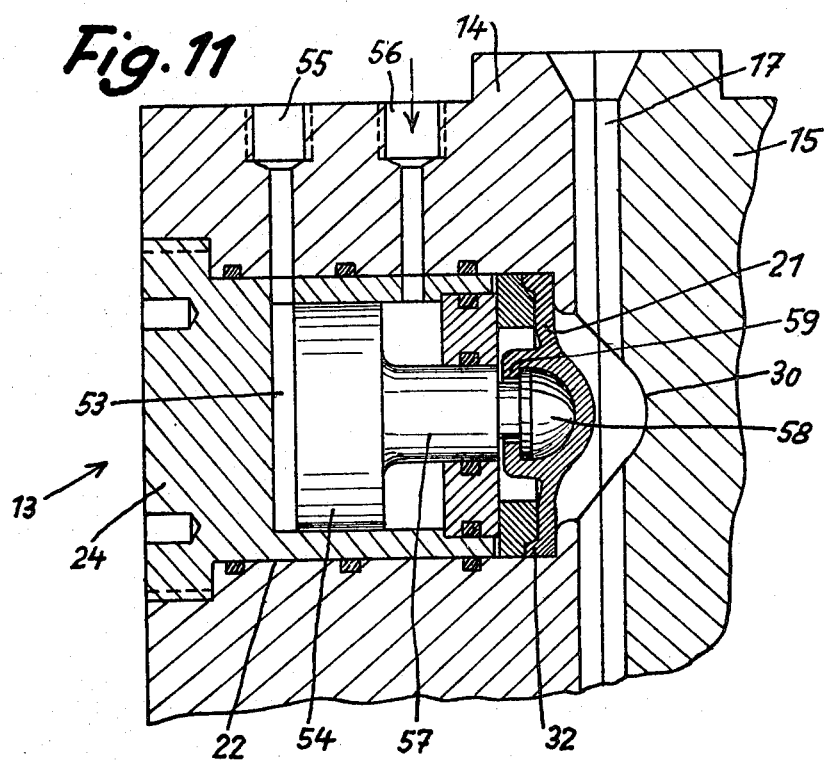

INJECTION MOULD HAVING A CLOSURE IN THE INJECTION CHANNEL PARTICULARLY FOR MOULDED SHAPES OF POLYURETHANE

BACKGROUND OF THE INVENTION

The invention relates to an injection mould for the manufacture of moulded shapes from an injectable material, with a device for closing the injection channel by means of an elastic deformable body, particularly in the processing of foamable synthetic materials.

The closures heretofore used by which the injection channel can be shut off at the end of an injecting operation use plate-type slide valves or similar devices. However, they are not particularly suitable, or even inappropriate, for various injection materials that are of low viscosity. This is so because such materials accumulate in joints, gaps, and corners. This problem appears particularly in the processing of polyurethane which is being used increasingly also for the manufacture of footwear or shoe soles, preferably while the sole is being attached to the upper by injection moulding.

SUMMARY OF THE INVENTION

This invention proposes a new closure device which is useful especially in injection moulds for making moulded shapes of polyurethane, avoiding the disadvantages heretofore known. The invention is characterized by the fact that the closing device comprises a diaphragm-type sealing disk, which can be operated approximately perpendicularly to the injection channel and which is substantially arranged in a plane parallel to the axis of the injection channel. In particular, this elastic closure body will be deformed by compressed air and pressed into the injection channel which thereby is sealed. The appropriate shape of the closure body will be that of a diaphragm-type sealing disk which can be forced through the mouth of a hole drilled across the injection channel and into this channel. Such a closure has various advantages. First of all it has a self-cleaning effect which is particularly useful in the case of injection materials such as polyurethane, mainly during the closing action, when any residues of the injection material will be expelled from the area of any corners and gaps present at the mouth of the cross-bore. Furthermore, the elasticity and moldability of the closing body provides for sufficient sealing in spite of the low viscosity of the injection material. Finally, the design of a closure of that type is very simple and still reduces any joints, corners, and gaps to a minimum.

DESCRIPTION OF PREFERRED EMBODIMENTS

In the following more particulars of the invention are shown in the drawings by way of examples. In these drawings FIG. 1 shows a part of an injection mould with the cross section of a device according to the invention;

FIG. 3 shows a part of the closure device according to the invention on an enlarged scale;

FIG. 4 and FIG. 5 show parts of a mouth of the device according to the invention, in a side view;

FIG. 7 is a front view of the device according to FIG. 6;

FIG. 8 shows a section through a further embodiment of the invention, the injection mould being one piece;

FIG. 9 shows a section through still another embodiment of the invention;

FIG. 10 shows part of an injection mould with a piston-operated closure body;

FIG. 11 shows another embodiment of the invention with a piston-operated closure body;

FIG. 12 shows the device according to FIG. 11, in closed position;

The invention concerns closure device for injection channel in injection moulds. The drawings show embodiments of the invention applied to an injection mould 10, especially for the manufacture of shoe soles from polyurethane, that are at the same time attached to the uppers by injection moulding. The injection mould 10, having a conventional design, has a mould cavity 11 for the moulded shape, and an injection channel 12 leading toward the mould cavity 11.

Figure 1:
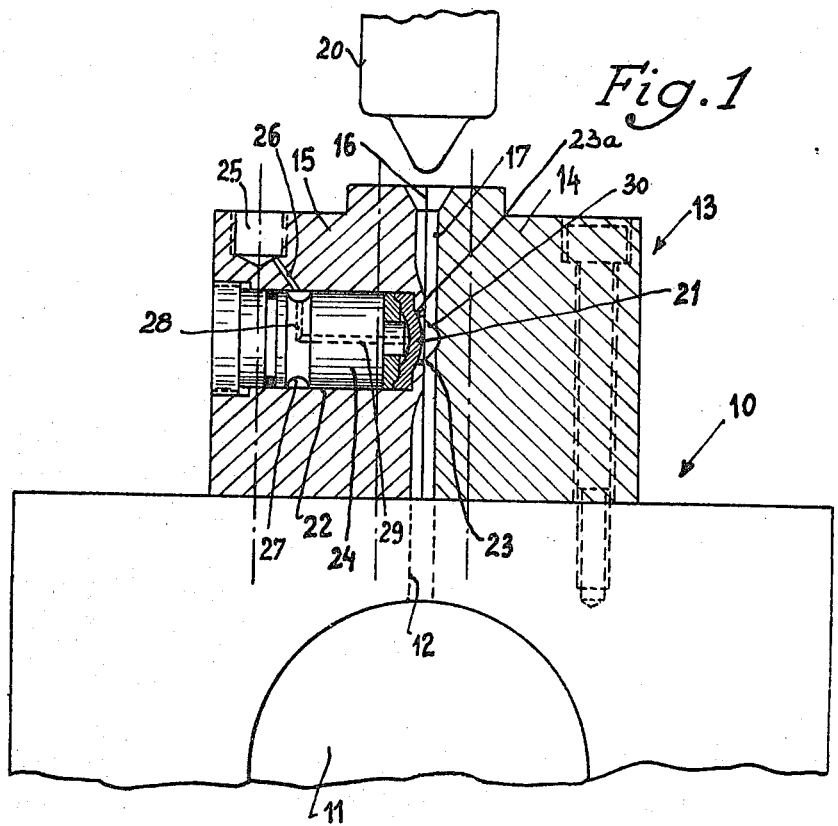
Figure 2:
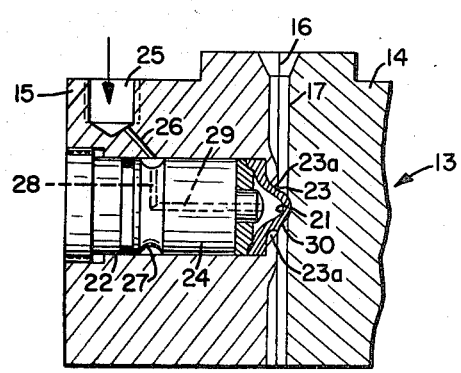
FIG. 2 shows a cross section of the device according to FIG. 1, the closure body being in a different position.

According to FIG. 1, an injection mouth or housing 13 is attached to the injection mould 10 from which it can be removed. This mouthpiece consists of two mouth halves 14 and 15 mating along a plane 16. An injection channel 17 is arranged in the injection mouth 13 in the midth of the plane, leading on one end to the injection mould 10, while an injection head 20 can be placed upon its other end. Injection channel 17 is formed by two grooves 18 and 19 in the surfaces of the mouth halves 14 and 15 facing each other, such grooves being a half or partial section each of the injection channel 17 (see FIG. 4 and FIG. 5).

A special closure now has been provided in the injection mouth 13 to interrupt feeding of material to the mould cavity 11. According to the invention this closure consists of an elastic deformable body forced into the injection channel 17, this body being particularly a diaphragm-type sealing disk 21 made of an elastic material, preferably of silicone. The sealing disk 21, when acted upon, changes its shape in a way that part of it penetrates into the injection channel 17 and seals it; this is done by compressed air as shown in FIGS. 1, 2, and 6 to 9, or by mechanical means according to FIGS. 10 to 13.

The sealing disk 21 is seated in a transverse or cross-bore 22 which is arranged approximately perpendicularly to the injection channel 17; according to FIGS. 1, 2, and 11 to 13, the cross-bore 22 has a mouth 23 whose diameter is reduced towards the injection channel 17. The rim 23a of mouth 23 is rounded off; the sealing disk when deformed will fit into it and seal the channel.

The sealing disk 21 is maintained in the cross-bore 22 by an insert 24 as shown in FIGS. 1, 2, and 11 to 13. The insert 24 is shaped cylindrically and may have a thread to be screwed into and removed from cross-bore 22; this insert 24 will press the sealing disk 21 — or at least its outer rim, adjacent to the mouth 23 — against a seat 33. Furthermore the insert 24 has the task of feeding a pressure-conveying agent, particularly compressed air, to the sealing disk 21 in order to operate it. For this purpose a pipe connection has been provided for a compressed air piping which is connected by a junction duct 26 to a ring or annular groove 27 of the insert 24. A radial bore 28 leads from this ring groove 27 to an axial bore 29 which opens into the side of sealing disk 21 opposite the injection channel 17. The diameter of the injection channel 17 has been reduced in the zone of the mouth 23 of cross-bore 22 to enable the sealing disk 21 to close the injection channel 17 suitably and reliably. This reduction of the inner diameter of the injection channel 17 is achieved by the groove 19 tapering on either side and ending at a distance from mouth 23 (FIG. 4). By this tapering of groove 19 no edges or corners are formed. Thus, injection channel 17 has a suitably reduced diameter in the area of the sealing disk. A cavity 30 having the form of a spherical segment is arranged in the mouth half 14 opposite the mouth 23 of injection channel 17; a part of the sealing disk 21 when in its blocking or locking position enters this cavity.

Figure 6:
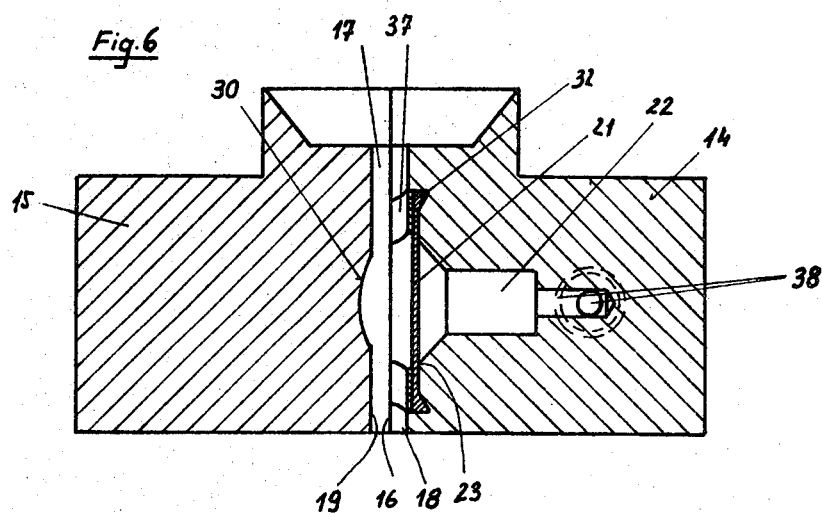
FIG. 6 shows part of an injection mould according to another embodiment of the invention, in a cross section along the line VI — VI of FIG. 7.
Figure 15:
FIG. 15 to FIG. 17 are some sectional views of different embodiments of the inventive sealing disks.
Figure 16:
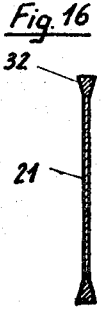
Figure 17:
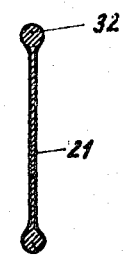

If the device is formed according to FIG. 6, a mouth 23 is enlarged in the shape of a funnel towards injection channel 17 and opposite the cross-bore 22. The diaphragm-type sealing disk 21 is clamped into this mouth 23 by means of a ring 37 fixing the edge of sealing disk 21. The pressure-conveying agent, which will be compressed air or a liquid under pressure according to FIGS. 6 and 7, is admitted through an angled pressure duct 38, or vacuum may be used when sealing disk 21 moves into its initial position as shown. In this embodiment the sealing disk 21 may also be maintained in its initial position by vacuum as long as the injection channel 17 is open, preventing the sealing disk 21 from forming any curvature that might enter injection channel 17.

FIG. 8 shows a closure device for one-piece injection moulds. A mouth 39 with injection channel 40 is attached to the injection mould. Section 41 leads from the injection channel 40 to a trough shaped recess 42 which is arranged either laterally or on top. A second section 43 leads from this cavity 42 to the mould cavity 11. The closure device is attached to the injection mould by means of a suitable adapter 44 in the area of the trough shaped recess 42 in such a way that admission of a pressure conveying agent to the sealing disk 21 facing the recess will cause the sealing disk to enter the trough shaped recess 42 and to shut the mouths of sections 41 and 43 facing the trough shaped recess 42.

FIG. 9 shows a similar embodiment. Here, the adapter 44 is inserted in a suitable recess 45 in the injection mould, placing the sealing disk 21 in the vicinity of a trough shaped recess 46 within the injection channel 12. The example of FIG. 10 shows a closure device having a sealing disk 21 to which air or liquid is admitted by piston 47. Piston 47 is driven pneumatically or hydraulically through a pressure piping 48 connected to a bore 49 in which piston 47 can reciprocate. But piston 47 may also be operated by purely mechanical means, i.e. by an actuating rod 50.

Piston 47 is fitted with a convex actuating head 51 facing the sealing disk 21, the curvature of actuating head 51 fitting preferably the trough of the opposite recess 30. In the closing position actuating head 51 forces the sealing disk 21 into the recess 30.

The closure devices shown in FIGS. 11 and 12 again use an insert 24. A chamber 53 is arranged in insert 24; air or liquid can be admitted through pressure pipes 55 and 56 in either direction to piston 54 moving in the chamber 53. A piston rod 57 has a head 58 to which sealing disk 21 is clamped by a ring lip 59 encircling head 58 round its neck. This connection between piston rod 57 and sealing disk 21 enables the latter to be moved in either direction by piston rod 57 and piston 54.

Figure 13:
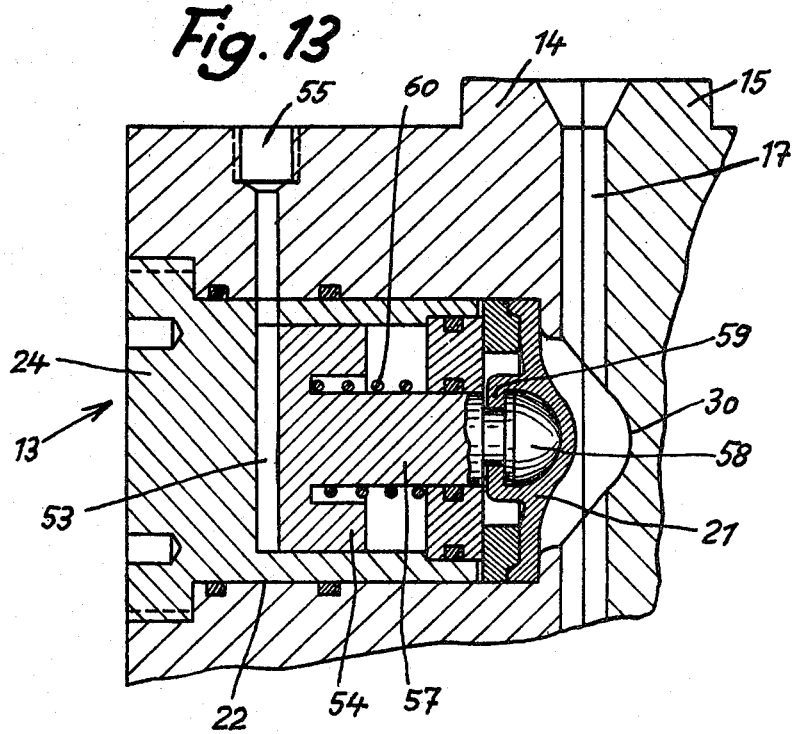
FIG. 13 shows an inventive device similar to FIG. 11 and FIG. 12 using another type of piston-operation.
Figure 14:
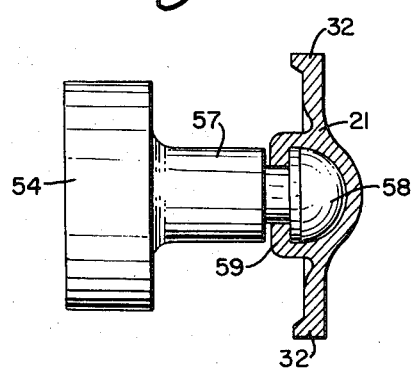
FIG. 14 shows a piston with closure body in detail.

The device shown in FIG. 13 differs from the design according to FIGS. 11 and 12 in that a pressure piping 55 has been arranged to admit air or liquid to piston 54 in closing direction only. Return motion back to the initial position is undertaken by a compression spring 60 housed in chamber 53. Sealing disk 21 may have various shapes. FIGS. 1, 2, 6, and 11 to 17 show cross sections of sealing disk 21 having a torus rim 32, projections round its edge, an annular bead or the like. These annular reinforcements 32 which may be of different cross sections and arranged on either or both sides of sealing disk 21, combined with a suitably shaped seat for the rim of the sealing disk, enable it to be arrested by spring action and guided motion. In the examples shown in FIGS. 1, 2 and 11 to 14 the reinforcement 32 around the rim of the sealing disk 21 faces the insert 24.

While there is shown and described present preferred embodiments of the invention, it is to be distinctly understood that the invention is not limited thereto but may be otherwise variously embodied and practiced within the scope of the following claims.

What we claim is:

1. An injection mould assembly for the manufacture of moulded articles from an injection mouldable material, particularly useful in the processing of foamable synthetic materials comprising
   means providing an injection channel for the injection mouldable material,
   a device for closing said injection channel by means of an elastic deformable body, comprising a substantially diaphragm-type sealing disk with lip means, said diaphragm-type sealing disk being arranged in a plane substantially parallel to the lengthwise axis of said injection channel,
   a piston arrangement having a head portion for operatively moving said diaphragm-type sealing disk approximately perpendicular to the lengthwise axis of said injection channel between an opening position and an injection channel-blocking position, said lip means of said sealing disk being secured to said head portion.

2. The injection mould assembly as defined in claim 1, further including means defining an enlargement of said injection channel, said sealing disk being housed in said enlargement of said injection channel.

3. The injection mould assembly as defined in clam 1, wherein said diaphragm-type sealing disk is formed of elastic material, and means providing a pressure-conveying agent for forcing said sealing disk into said injection channel.

4. The injection mould assembly as defined in claim 3, wherein said diaphragm-type sealing disk is formed of silicone rubber.

5. The injection mould assembly as defined in claim 1, further including means defining a cross-bore communicating with said injection channel, said cross-bore including a mouth portion possessing a reduced internal diameter in a direction towards said injection channel, said sealing disk being housed in said cross-bore.

6. The injection mould assembly as defined in claim 1, wherein said injection channel has a reduced diameter at the region of said sealing disk.

7. The injection mould assembly as defined in claim 6, wherein said injection channel has said reduced diameter at the side facing said sealing disk.

8. The injection mould assembly as defined in claim 1, further including means defining a cross-bore communicating with said injection channel, said cross-bore having a mouth portion confronting said injection channel, means defining a cavity seated opposite said mouth portion for receiving said sealing disk when the latter moves into its closing position.

9. The injection mould assembly as defined in claim 1, wherein said piston arrangement is movable between an opening and blocking position corresponding to the opening position and blocking position of said injection channel, and means for admitting a pressure-conveying agent to said piston arrangement for displacing such selectively into said opening position and blocking position respectively.

10. The injection mould assembly as defined in claim 1, further including means defining a substantially trough-shaped recess for receiving a correspondingly shaped portion of said sealing disk, said piston arrangement being equipped with actuating head means confronting said sealing disk, said actuating head means possessing a substantially spherical surface which mates with said corresponding shaped portion of said sealing disk.

11. The injection mould assembly as defined in claim 1, further including adaptor means for housing said closure device, means defining a substantially trough-shaped recess through which passes said injection channel, said adaptor means being arranged at the region of said trough-shaped recess.

* * * * *